United States Patent [19]

Mehrotra

[11] 4,393,489

[45] Jul. 12, 1983

[54] AUDIO PROCESSOR FOR SINGLE, CHANNEL, MATRIXED TWO-CHANNEL AND UN-MATRIXED TWO-CHANNEL SIGNALS

[75] Inventor: Gopi N. Mehrotra, Carmel, Ind.

[73] Assignee: RCA Corporation, New York, N.Y.

[21] Appl. No.: 248,776

[22] Filed: Mar. 30, 1981

[51] Int. Cl.³ .................. G11B 3/74; G11B 27/36; H04N 5/76; H04H 5/00

[52] U.S. Cl. .................. 369/86; 369/61; 358/342; 179/1 GM

[58] Field of Search .................. 369/86, 49, 61, 134, 369/174, 175; 179/1 GB, 1 GM; 360/19, 20, 29, 30, 38, 19.1, 38.1; 358/128.5, 127, 4, 8, 341, 342

[56] References Cited

U.S. PATENT DOCUMENTS

| | | | |
|---|---|---|---|
| 3,969,756 | 7/1976 | Pamer et al. | 358/4 |
| 4,119,812 | 10/1978 | Fox | 369/175 X |
| 4,157,455 | 6/1979 | Okatani et al. | 179/1 GM |
| 4,194,087 | 3/1980 | Sakaida | 179/1 GM X |
| 4,221,930 | 9/1980 | Okuno | 179/1 |
| 4,280,101 | 7/1981 | Ishida et al. | 179/1 GM X |
| 4,309,722 | 1/1982 | Palmer | 358/128.5 |
| 4,323,934 | 4/1982 | Giraud | 369/61 X |

OTHER PUBLICATIONS

"Microelectronics, Digital and Analog Systems", Millman/McGraw-Hill Book Co., (1979), pp. 631, 632.
*Radio Electronics*, "Videodisc, a Look at the Circuitry", Stecker, Jul. 1979, pp. 39, 40.

*Primary Examiner*—Aristotelis M. Psitos
*Attorney, Agent, or Firm*—E. M. Whitacre; J. S. Tripoli; R. G. Coalter

[57] ABSTRACT

Audio signals recovered from a video disc record are applied to a dual mode decoder matrix via track and hold circuits which mute the audio signals in response to defect indicating signals and player mode control signals. A selected one of the mode control signals is applied to the matrix for causing the matrix to form sum and difference output signals at first and second output terminals thereof when at a first logic level and for causing the matrix to produce identical output signals at the output terminals when at a second logic level. Logic circuitry controls the muting and the matrix operating mode to provide compatibility with monophonic, matrixed two channel (e.g., stereophonic) and un-matrixed two channel (e.g., bilingual) video disc records and suppression of record noise in all operating modes.

6 Claims, 3 Drawing Figures

AUDIO PROCESSOR FOR SINGLE, CHANNEL, MATRIXED TWO-CHANNEL AND UN-MATRIXED TWO-CHANNEL SIGNALS

This invention relates generally to audio signal processing and more particularly to signal processing compatibility for the playback of monophonic, stereophonic and bilingual video disc records.

Video disc record formats have been proposed in which sound and picture signals are recorded on separate FM carriers and recovered by respective FM demodulators in a video disc player. Keizer, in U.S. Pat. No. 3,972,064, describes a player having a single sound demodulator for playing monophonic records. Palmer et al. in U.S. Pat. No. 3,969,756, describe a player having stereophonic-bilingual capabilities and which includes two sound demodulators having center frequencies below the picture carrier frequency and selected to be at odd multiples of half the horizontal line rate to minimize sound/picture interference. Fox, in U.S. Pat. No. 4,119,812, describes a player having stereophonic/bilingual capabilities and which includes track and hold amplifiers at the outputs of the sound demodulators. The amplifiers are controlled by a common noise detector and normally operate in a tracking mode to pass the demodulated sound signals to a utilization device but when noise is present they change to a hold mode to effectively mute the sound signals.

Okuno, in U.S. Pat. No. 4,221,930, describes a video disc player compatible with monophonic, stereophonic and bilingual records. A feature of the Okuno player is that the player mode of operation is automatically switched from monophonic to stereophonic/bilingual by means of a detector which senses the presence or the absence of one of the FM carriers. If only one FM carrier is present, the detector activates a switch which couples both of the player audio output terminals to the output of the demodulator which is receiving an audio FM carrier whereby the monaural program appears at both output terminals. Conversely, if both FM carriers are present, the switch is disabled and the output of each demodulator is coupled to a respective player output terminal.

A presently commercially available video disc player having monophonic, stereophonic and bilingual capabilities is described in the June and July, 1979, issues of the magazine "Radio-Electronics". The audio processing circuitry includes a pair of FM demodulators for the sound carriers and a switching arrangement having three modes of operation. In a first mode (e.g., the stereophonic mode) the output of each demodulator is coupled to a respective one of the player audio output terminals. In a second mode (e.g., bilingual) the switching arrangement couples the output of one of the demodulators to both of the player output terminals. The third mode is similar to the second except that the output of the other demodulator is coupled to the player output terminals.

One characteristic common to the stereo-bilingual players described above is that the sound processing channels are substantially independent in the sense that one sound channel is committed to conveying either a first language or the left stereo signal and the other is committed to conveying either a second language or the right stereo signal. This can lead to a problem in that where a videodisc record is recorded with left and right stereophonic signals on separate FM carriers the record can not be played back on a monophonic player of the type suggested by Keizer without loss of one of the stereo signals.

One aspect of the problem of "backward compatibility" (i.e., the ability to play a stereophonic video disc record on a monophonic player without loss of one of the audio signals) may be solved by recording the record with sum (L+R) and difference (L−R) signals for stereophonic program material. A monophonic player of the kind disclosed in the aforementioned Keizer patent would then be able to demodulate the sum signal with its single FM demodulator and the information of both stereo channels would thus be recovered.

A video disc player compatible with monaural and matrixed stereophonic records is described in the co-pending U.S. patent application of R. C. Palmer (Ser. No. 153,626, filed May 27, 1980, now U.S. Pat. No. 4,309,722 which issued Jan. 5, 1982). The Palmer player includes two sound demodulators and a stereo matrix circuit. For monophonic records the L−R demodulator is squelched and the output of the L+R demodulator (i.e., the monaural program signal) is applied via the summing portion of the stereo decoder matrix to the player output terminals. For stereophonic records, both of the demodulators are enabled and the L and R sound signals are decoded from the sum (L+R) and difference (L−R) signals by means of adders and subtractors in the matrix and applied to the respective player output terminals.

Summarizing to this point, the monophonic player proposed by Keizer and the monophonic/stereophonic player of Palmer are each compatible with monophonic and matrixed stereophonic video disc recods. Certain problems arise, however, regarding compatibility of such players with bilingual video disc records. As an example, although a video disc record recorded with bilingual program material in matrixed form could be played on a player having a stereo decoder, it is doubtful that the degree of channel separation obtainable by conventional stereo decoders would be acceptable for purposes of separating two different languages (or other similarly un-related audio signals). Such a record would also not be compatible with a monophonic player because the single audio demodulator in such a player would produce a completely discordant signal comprising the sum (or difference) of two languages.

Video disc records of the type in which stereophonic material is recorded in matrixed form (i.e., L+R on one FM carrier and L−R on the other FM carrier) and in which bilingual (or other two channel) material is recorded in unmatrixed form (i.e., each language or program being recorded on a respective one of two FM carriers) are compatible with monophonic players of the kind described by Keizer with the exception that only one of the two languages (e.g., the "primary" language) can be recovered without changing the player FM demodulator center frequency. Such records are also compatible, at least insofar as monaural and stereophonic programs are concerned, with players of the general kind proposed by Palmer but lack compatibility with regard to reproduction of unmatrixed bilingual program material because of the presence of the decoder matrix. If allowed to perform its normal function, the matrix would cause sum and difference output signals to be produced rather than a selected one of the two languages.

It is an object of the invention to provide a video disc player suitable for use with monaural, matrixed stereophonic and unmatrixed two channel (e.g., bilingual) records.

It is a further object of the invention to provide a video disc player having single channel, matrixed two channel and unmatrixed two channel operating modes and in which certain elements of the player provide the dual functions of noise suppression and operating mode control to simplify and thereby improve the reliability of the player.

In accordance with the invention, signal processing means responsive to an audio input signal manifestation provides first and second audio signals and respective first and second audio defect indicating signals. The audio signals are supplied to an audio matrix means responsive in a first operating mode for producing a first output signal proportional to a sum of the audio signals and a second output signal proportional to a difference of the audio signals, the audio matrix means having a second operating mode wherein each of said first and second output signals is proportional to the sum of the audio signals. An audio muting means is coupled to the signal recovery means and responsive to first and second muting signals supplied thereto for muting respective ones of the first and second audio signals. Control means produces first and second player mode control signals and applies the first control signal to the matrix means for controlling the operating mode thereof. Logic means supplies at least one of the first control signal and the first defect indicating signal as the first muting signal to the muting means and supplies at least one of the second control signal and the second defect indicating signal as the second muting signal to the muting means.

The invention is illustrated in the accompanying drawings wherein like reference designators denote like elements and in which.

Figure 1:
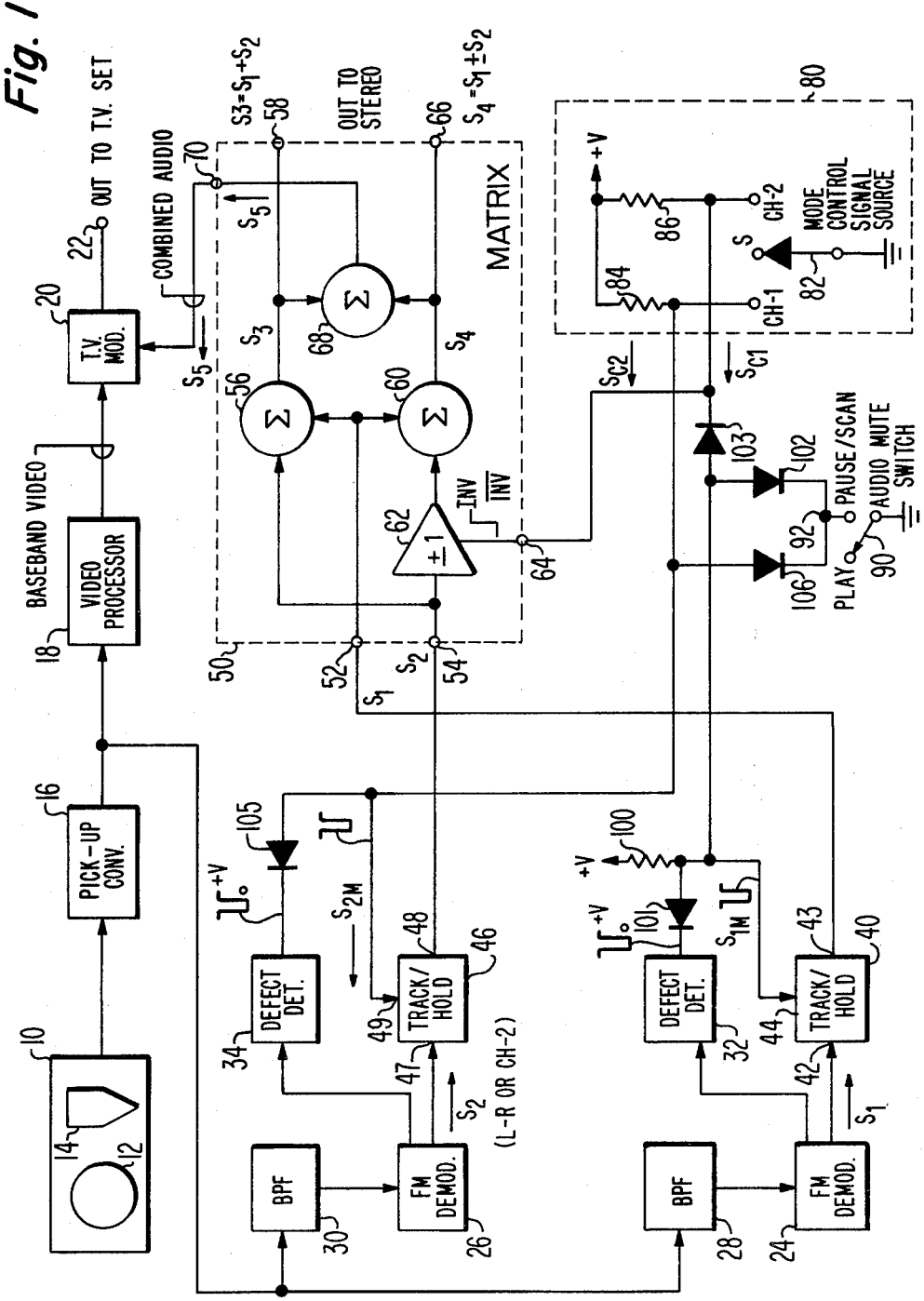
FIG. 1 is a block diagram, partially in schematic form, of a video disc player embodying the invention.

The video disc player of FIG. 1 includes a player mechanism 10 having a turntable for rotating a video disc record 12 and a pickup transducer 14 for recovering frequency modulated audio and video signals from the record. Illustratively, it will be assumed that the player is intended for use with records of the type in which information is stored in the form of topological variations and recovered by sensing capacitance variations between pickup transducer 14 and the record 12. (Alternatively, the record and transducer may be of the well known optical type). The output of transducer 14 is coupled to the input of a pickup converter 16 which includes a capacitance-to-voltage converter responsive to capacitance variations between a stylus in transducer 14 and the record being played for producing an FM output signal voltage representative of the recorded information. Such records and suitable circuits for implementing the capacitance-to-voltage conversion function of converter 16 are well known. See, for example, U.S. Pat. No. 3,783,196 entitled "High Density Capacitive Information Records and Playback Apparatus Therefor" which issued to T. O. Stanley, Jan. 1, 1974; U.S. Pat. No. 3,972,064 entitled "Apparatus and Methods for Playback of Color Pictures/Sound Records" which issued to E. O. Keizer, July 27, 1976 and U.S. Pat. No. 3,711,641 entitled "Velocity Adjusting System" which issued to R. C. Palmer, Jan. 16, 1973.

The output of converter 16 is applied to the input of a video processor 18 which includes a demodulator for demodulating the video FM signal to baseband. Illustratively, the demodulator may be of the pulse counting type or of the phase lock loop (PLL) type. A suitable pulse counting type of FM demodulator is disclosed in U.S. Pat. No. 4,038,686 entitled "Defect Detection and Compensation" which issued to A. L. Baker, July 26, 1977. An FM demodulator of the PLL type is described in U.S. Pat. No. 4,203,134 which issued to Christopher et al. May 13, 1980.

It is preferable, in video disc player applications, that the video signal be recorded on disc 12 in the "buried subcarrier" (BSC) format proposed by D. H. Pritchard in U.S. Pat. No. 3,872,498 entitled "Color Information Translating Systems" which issued Mar. 18, 1975. In the BSC format, chrominance information is represented by a color subcarrier of the general form employed in the well-known NTSC format. However, the chrominance component in the BSC format is not located in the high end of the luminance signal band, as in NTSC, but rather is buried in a lower portion of the video band. Accordingly, video processor 18 includes conversion circuitry for translating the recovered chrominance signal component to the high end of the video signal band. Pritchard describes a suitable converter. Another suitable converter in which errors in the disc-transducer relative velocity and errors in the chrominance signal frequency are corrected by means of a color burst locked two loop servo system is described in U.S. Pat. No. 3,965,482 of T. W. Burrus.

A preferred implementation of video processor 18 for NTSC standard players is disclosed in the U.S. Pat. No. 4,247,866 of J. A. Wilber and T. J. Christopher. A suitable implementation for PAL standard players is disclosed in the U.S. patent application of J. G. Amery entitled "Chrominance Transcoder" Ser. No. 154,597 filed May 29, 1980.

The baseband video signal produced by video processor 18 is applied to the video carrier modulation input terminal of a TV modulator 20 which has an output terminal 22 for connection to the antenna terminals of a conventional television receiver (not shown). The audio portion of the signal recovered from disc 12 is processed as will be described and applied to the baseband audio input terminal of modulator 20 which produces picture and sound carrier waves on a selected TV channel for reception by the televison receiver. An integrated circuit suitable for use as TV Modulator 20 and which may be selectively operated to produce an output signal on channels 3 or 4, for example, is the model LM 1889N "TV Video Modulator" made by National Semiconductor Company, Inc.

Audio signals $S_1$ and $S_2$ are recovered from disc 12 in the video disc player by applying the output of pick-up converter 16 to a pair of FM demodulators 24 and 26 via respective band pass filters 28 and 30. Preferably, the sound carrier center frequency choices correspond to odd multiples of half the line frequency as proposed in the aformentioned Palmer et al. patent. Illustratively, for NTSC video disc players, filters 28 and 30 may have center frequencies of about 715 KHz and 905 KHz, respectively, and bandwidths somewhat wider than the sound carrier peak deviation so as to ensure passage of first order and second order sideband components of the modulator sound carriers. The audio signal recovery portion of the player also includes a pair of defect detectors 32 and 34 coupled to FM demodulators 24 and 26, respectively, for detecting frequency departures beyond prescribed limits of the sound carriers passed by filters 28 and 30 and producing defect indicating signals. A preferred form of defect detector for a PLL type of FM demodulator is disclosed in the aforementioned Christopher et al. U.S. Pat. No. (4,203,154). A preferred defect detector for a pulse counting type of FM demodulator is disclosed in the aforementioned Baker Pat. No. (4,038,686). As used herein, the term "defect" includes a complete loss of a sound carrier as may occur, for example, when the player is in a pause mode of operation as well as brief amplitude or phase disturbances of the carrier as might be caused, for example, by dust particles, tracking errors and the like when the player is in its normal or "play" mode of operation.

For purposes of illustration and the following discussion, the defect signal produced by each of detectors 32 and 34 will be assumed to be normally at a high level (+V volts) in the absence of defects and assumes a low level (0 Volts or ground level) when a defect is detected. This will be recognized as a "negative" or "active low" logic convention and is a matter of design choice in a given video disc player. One may readily practice the invention with elements which generate and respond to signals having an "active high" or "positive" logic convention if desired (e.g., NAND gates may be replaced by OR gates when changing logic conventions).

The audio signals $S_1$ and $S_2$ produced by FM demodulators 24 and 26, respectively, are coupled to the audio input terminals 52 and 54, respectively, of a dual mode audio matrix circuit 50 via respective track and hold circuits 40 and 46. The track and hold circuits serve as audio muting means for muting respective ones of signals $S_1$ and $S_2$ in response to respective audio muting signals $S_{1m}$ and $S_{2m}$ supplied to control terminals thereof.

Circuit 40 has an input terminal 42 for receiving the audio signal $S_1$, an output terminal 43 for supplying the signal $S_1$ to terminal 52 of matrix circuit 50 and a control terminal 44 for receiving a first muting signal ($S_{1m}$). Circuit 40 is of a type in which the signal at terminal 43 normally follows or tracks the signal at terminal 42 but when the muting signal is present at terminal 44 assumes a "hold" mode of operation which effectively blocks or mutes the signal $S_1$ at terminal 43 by maintaining terminal 43 at a potential substantially equal to the last value of $S_1$. For this specific example of the invention, a low level signal (e.g., ground) at terminal 44 signifies the presence of the muting signal which places circuit 40 in its hold mode and a high level signal (e.g., +V volts) signifies the absence of the muting signal and places circuit 40 in its tracking mode. Circuit 46 is identical to circuit 40 except that its input terminal 47 is connected to receive the signal $S_2$, its output terminal 48 is connected to supply the signal $S_2$ to terminal 54 of matrix circuit 50 and its control terminal 49 is connected to receive the second muting signal ($S_{2m}$).

Although muting of the audio signal $S_1$ and $S_2$ could be performed by series or shunt switches, the use of track and hold circuits for providing this function has been found advantageous in the present invention because they provide the dual functions of noise suppression and player mode control. It is the holding mode feature of these circuits which prevents abrupt transitions of the signals $S_1$ and $S_2$ in response to the muting signals $S_{1m}$ and $S_{2m}$. Since the muting signals are derived from the defect signals and the player mode control signals there is little audible effect (i.e., switching noise) produced when either the player mode control switch is changed or when defect signals are present.

The dual mode audio matrix circuit comprises a first summing circuit 56 having input terminals connected to terminals 52 and 54 and an output terminal connected to output terminal 58 of the matrix circuit for providing thereat an output signal $S_3$ representative of the sum of $S_1$ and $S_2$ (either or both of these signals may be "null" signals, that is, they may be muted depending on the state of circuits 40 or 46). The matrix circuit also includes a second summing circuit 60 having one input terminal connected to terminal 52 for receiving the signal $S_1$ and a second input terminal coupled to terminal 54 via a sign reversing or "bi-phase" amplifier 62 for receiving either $S_2$ or its inverse $-S_2$ depending upon the level of a control signal supplied to a control terminal 64 of amplifier 62. When terminal 64 is at a high level (e.g., +V Volts) amplifier 62 inverts the signal $S_2$ whereby summing circuit 60 supplies an output signal $S_4$ to matrix circuit output terminal 66 equal to the difference between $S_1$ and $S_2$ (i.e., $S_4 = S_1 - S_2$). Conversely, when terminal 64 is at a low level, amplifier passes $S_2$ without inversion to summing circuit 60 whereby $S_4$ becomes equal to the sum of $S_1$ and $S_2$ (i.e., $S_4 = S_1 + S_2$). The audio signals $S_3$ and $S_4$ produced by summing circuits 56 and 60 are summed in a further summing circuit 68 which supplies the resultant combined baseband audio signal $S_5$ to an output terminal 70 of the matrix circuit which terminal 70 is connected to the audio carrier modulation input terminal of TV modulator 20.

Control of the operating mode of matrix circuit 50 and track and hold amplifiers 40 and 46 is provided by a mode control signal source 80, an audio muting switch 90 and a logic network including diodes and resistors connected to form, in effect, a pair of NAND logic gates. As previously noted, the use of a negative logic convention is arbitrary and a positive logic convention may be adopted instead by appropriate choice of control signal polarities. Also, the switches 90 and 82 are shown as being mechanical switches for ease of illustration and to simplify the drawing. It will be appreciated that mechanical switches may be replaced by electrical switches (e.g., transistors, logic gates and the like) in a given application of the invention.

The mode control signal source comprises a three position switch 82 having a grounded wiper and three terminals identified by the mode control function the player assumes when the wiper is in the corresponding position. In the left most position, for example, the player will reproduce channel one (CH-1) of a monaural record or the "primary" language of a two channel un-matrixed bilingual disc. In the center position (S) of switch 82 the player will reproduce sound from a matrixed stereophonic record. In the right most switch position channel two (CH-2) of an unmatrixed two channel (e.g., bilingual) record will be reproduced.

Pull-up or biasing resistors 84 and 86 are coupled between a source of supply voltage +V and terminals CH-1 and CH-2, respectively. No connection is made to terminal S. Accordingly, when switch 82 is in position S (stereo mode), terminals CH-1 and CH-2 are both high (i.e., at +V Volts) whereas for either of the other positions one of terminals CH-1 or CH-2 will be grounded. This grounded condition signifies the presence of the "active" state of the control signal $S_{1c}$ or $S_{2c}$ produced by mode control signal source 80.

The control signal $S_{1c}$ is applied to terminal 64 of matrix circuit 50 and to a first input of a three input NAND logic gate having an output connected to terminal 44 of track and hold circuit 40, a second input connected to the output of defect detector 32 and a third input connected to a pause/scan output terminal 92 of an audio muting switch 90 which grounds terminal 92 when closed. The NAND gate comprises a pull-up or biasing resistor 100 connected between the supply voltage source +V and the anodes of diodes 101, 102, and 103 the cathodes of which are connected, respectively, to the output of defect detector 32, the output terminal 92 of audio muting switch 90 and to terminal CH-2 of switch 82. The output of the NAND gate (i.e., the common connection of elements 100–103) is connected to terminal 44 of track and hold circuit 40.

The control signal $S_{2c}$, the pause signal produced by audio mute switch 90 and the defect indicating signal produced by defect detector 34 (all "active low") are applied to terminal 49 of track and hold amplifier 46 via the equivalent of a second three input NAND gate. In this case, however, the gate is considerably simplified requiring only two diodes 105 and 106, the anodes of which are connected to terminal 49 of track and hold circuit 46 and to terminal CH-1 of switch 82. The cathodes of diodes 105 and 106 are connected, respectively, to the output of defect detector 34 and terminal 92 of audio mute switch 90. The function of providing pull up bias for the gate is provided by resistor 84 in signal source 80.

For both of the illustrated gates, a low level signal (e.g., ground) at any input or combination of inputs will cause a low level signal to be applied to the control terminals of the respective track and hold amplifier to which the gate output is connected thereby placing the amplifier in its "hold" mode of operation. The track and hold amplifiers will assume a tracking mode of operation if and only if all inputs to their respective gates are high. Stated in terms of a positive logic convention, the track and hold amplifiers mute the signals $S_1$ and $S_2$ in accordance with the inclusive logical sum of the respective defect indicating, muting and mode control signals supplied to their associated control gates.

In operation, elements 10–18 and 24–34 function as a source of baseband video, audio and defect indicating signals as previously explained. The processing of the audio signals, and particularly the interactive relationships of the dual mode audio matrix circuit 50 and the track and hold circuits 40 and 46, is most easily understood by considering some specific examples of playing different kinds of discs on the player.

As a first example, assume that the video disc record 12 is a stereophonic record with the sum signal L+R recorded on the 715 KHz sound carrier and the difference signal L−R recorded on the 905 KHz carrier. Such a record, as previously explained, is fully compatible with monophonic video disc players having a single 715 KHz sound demodulator. To play such a record, switch 82 would be placed in position S (stereo) whereby amplifier 62 will invert the signal $S_2$ so that the matrix circuit 50 will produce sum $S_1+S_2$ and difference $S_1−S_2$ signals as previously explained. Since $S_1=L+R$ and $S_2=L−R$ for the assumed conditions, the matrixed stereophonic signals will be separated at terminals 58 and 66 of matrix circuit 50 by the addition and subtraction provided by summing circuits 56 and 60 respectively. The signal $S_3$ at terminal 58, for example, will equal (L+R)+(L−R) or 2L and $S_4$ will equal (L+R)−(L−R) or 2R. The sum of these signals, $S_5$, supplied to TV modulator 20, will thus be a monophonic signal equal to 2(L+R). For all output signals the amplitude scale factor (times two) assumes lossless summing. For simple resistive summing networks having an insertion loss of 6 dB the output signals $S_3$, $S_4$ and $S_5$ would be L, R and (L+R)/2, respectively.

During normal play of the record, track and hold circuits 40 and 46 mute the signals $S_1$ and $S_2$, respectively, in response to the defect indicating signals produced by detectors 32 and 34, respectively, thereby minimizing record noise (i.e., ticks and pops). The track and hold circuits also mute the signals $S_1$ and $S_2$ upon closure of the audio mute switch 90 as would be the case, for example, when the player is placed in a pause or scan mode of operation. For capacitance pick-up type video disc players it is preferable that switch 90 be an electronic switch controlled by the signal which operates the pick-up transducer arm lifter mechanism so that audio muting occurs whenever the transducer is lifted from the record. To a certain extent the defect detectors will provide some muting action in such a case due to the absence of the audio carriers but complete muting independent of the defect detectors is more reliable and thus more desirable in such a case. It is also desirable that switch 90 be automatically closed during scan modes of operation of the player to avoid annoying bursts of sound which might not be muted by the defect detectors.

As a second example of player operation, assume that the video disc record 12 being played is either a monophonic record having a single sound carrier at 715 KHz or is an un-matrixed bilingual record in which the desired language to be played is recorded at 715 KHz. In this case switch 82 would be placed in position CH-1 thereby maintaining track and hold circuit 46 in its hold mode and thus muting the signal $S_2$ produced by the 905 KHz demodulator 26. As a result, no signal would be applied to the input of amplifier 62 and thus it does not matter whether amplifier 62 is in its inverting or non-inverting mode of operation. The signal $S_1$ will appear at all three output terminals 58, 66, and 70 of matrix circuit 50 because of the coupling provided by summing circuits 56, 60, and 68. The audio muting switch 90 and defect detector 32 will perform the same function as in the stereo mode of operation.

As a third example of player operation, assume that the record being played is an un-matrixed bilingual record and that the desired language to be played is recorded on the 915 KHz sound carrier. This example is similar to the second one except that amplifier 62 is placed in its non-inverting mode of operation to avoid a phase problem which would otherwise result in out-of-phase signals being produced at the player stereo output terminals 58 and 66 and complete cancellation of the signal $S_5$ supplied to the TV modulator. If not corrected for, this condition would result in no sound being produced by the TV receiver connected to terminal 22 and an acoustic null being created between the speakers of a stereo system connected to terminals 58 and 66.

In more detail, for the assumed conditions, when switch 82 is placed in position CH-2 the signal $S_1$ is muted by track and hold circuit 40 so that no signal appears at terminal 52 of matrix circuit 50. At the same time, track and hold circuit 46 supplies $S_2$ to terminal 54.

Since amplifier 62 is maintained in its non-inverting mode by means of control signal $S_{1c}$, the signal $S_2$ appears in phase at each of summing circuits 56 and 60. Accordingly, the signals at terminals 58 and 66 will also be in phase and no cancellation of the signal $S_5$ can occur.

Figure 2:
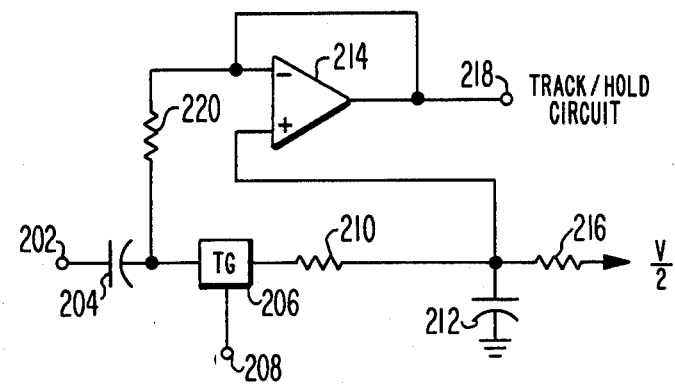
FIG. 2 is a block diagram, partially in schematic form, of a track and hold circuit suitable for use in the player of FIG. 1.

FIG. 2 is illustrative of a preferred implementation of a track and hold circuit suitable for use as circuits 40 and 46 in the video disc player of FIG. 1. Unlike conventional track and hold circuits in which the output voltage is held substantially constant in the holding mode and in which the amplitude response is independent of frequency in the tracking mode, the circuit includes a discharge path for causing the output voltage to assume a reference level within a predetermined length of time for minimizing certain transient effects and also exhibits a low pass characteristic for providing deemphasis of the audio signal. Thus, the circuit of FIG. 2 provides two additional functions in the video disc player of the present invention over the three functions previously mentioned (system muting, noise reduction and mode control).

The circuit comprises an input terminal 202 for receiving the input signal ($S_1$ or $S_2$), a capacitor 204 connected between terminal 202 and the input of a transmission gate 206 having a control terminal 208 for receiving the muting signal ($S_{1m}$ or $S_{2m}$). The output of gate 206 is connected via a resistor 210 to one plate of a capacitor 212, the other plate of which is grounded. The one plate of capacitor 212 is also coupled to the non-inverting input of an operational amplifier 214 and via a resistor 216 to a source of reference potential equal to the desired average value of the audio output signal of the circuit. For systems employing dual positive and negative supplies, resistor 216 would be connected to ground. For single supply systems (as here) it would be connected to a source of potential equal to half the supply voltage to achieve maximum output signal dynamic range. The inverting input terminal of amplifier 214 is connected to the amplifier output terminal, to the circuit output terminal 218 and via resistor 220 to the input of transmission gate 206.

In operation, an input signal applied to terminal 202 will be coupled to capacitor 212 via capacitor 204, transmission gate 206 and resistor 210 when the control signal at terminal 208 is high (+V Volts). This represents the tracking mode of operation of the circuit. Amplifier 214 serves as a voltage follower to provide a low output impedance at output terminal 218 with minimal loading of capacitor 212. Resistor 210, in combination with capacitor 212 forms a lag network that provides deemphasis of the audio signal. Suitable values for resistor 210 and capacitor 212 are 36 K Ohms and 2200 pF, respectively, for a deemphasis time constant of about 80 microseconds. Resistor 210 may be omitted if such deemphasis is not desired in a given application.

Capacitor 204 removes the d.c. component of the audio input signal to allow re-establishment of the d.c. component by means of resistor 216. For the specific circuit shown, the d.c. component of the output signal will equal $+V/2$ and will be independent of whatever d.c. component the input signal may contain. A suitable value for resistor 216 is 4.7 MOhms which, in combination with the value of capacitor 212 results in a discharge/charge time constant of over 10 milliseconds. This is substantially longer than the duration of most defect pulses so that the overall circuit usually holds the last value of the input signal during the entire defect pulse period. For longer periods of muting (gate 206 turned off by a low level signal at terminal 208) such as during a pause mode of operation capacitor 212 will discharge (or charge) to the potential $+V/2$ which is the average d.c. level desired for a single power supply system (0 Volts for a dual supply system).

Resistor 220 provides a charge/discharge path for d.c. blocking capacitor 204 when gate 206 is open. A suitable value for resistor 220 is 4.7 MOhms. Capacitor 204 is preferably substantially larger than capacitor 212 to avoid introducing an undesired lead breakpoint in the circuit transfer function. If deemphasis is not desired, resistor 210 may be omitted. If re-establishment of the average d.c. component of the audio signal is not desired, resistor 220 and capacitor 204 may be omitted.

Figure 3:
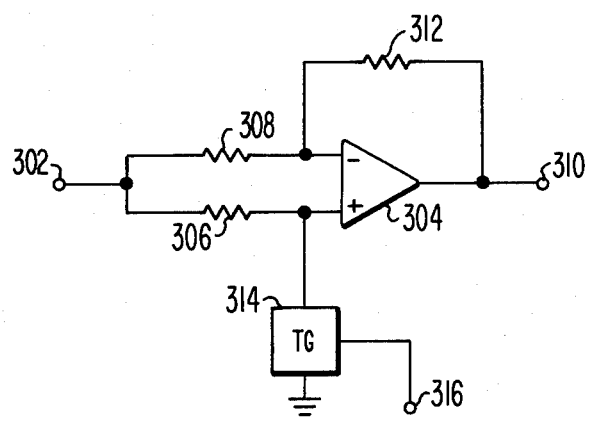
FIG. 3 is a block diagram, partially in schematic form, of sign reversing or bi-phase amplifier suitable for use in the audio matrix portion of the player of FIG. 1.

FIG. 3 shows a suitable implementation of the biphase or sign reversing amplifier circuit suitable for use as amplifier 62. A similar amplifier is shown and described by J. Millman at pages 631–632 of the text "MICROELECTRONICS" published by McGraw-Hill Book Company in 1979.

The circuit of FIG. 3 comprises an input terminal 302 coupled to the inverting and non-inverting input terminals of an operational amplifier 304 via resistors 306 and 308. The amplifier output is connected to the circuit output terminal 310 and via a feedback resistor 312 to its inverting input terminal. A transmission gate 314 is connected between the amplifier non-inverting input terminal and ground and controlled by a signal supplied to terminal 316. A suitable transmission gate is the type CD 4016 integrated circuit which includes four gates in one package. All resistors are equal valued.

In operation a positive (+V) signal applied to terminal 316 will turn on gate 314 thereby grounding the non-inverting input terminal of amplifier 304. In such a case the circuit provides signal inversion and exhibits a gain determined by the ratio R312/R308 which is unity since R312=R308. When the signal at terminal 316 is at ground level the circuit provides unity gain without inversion, that is, amplifier 304 acts simply as a unity gain buffer amplifier or voltage follower. The circuit gain in this case is not influenced by the values of resistors 306, 308 or 312 (none conduct any substantially current in this mode) but the amplifier offset is influenced to a certain extent by their values due to the flow of amplifier input bias current. Satisfactory offset values have been obtained by making all resistors equal valued. A value on the order of 22 K Ohms or so has been found quite satisfactory for typical moderate performance operational amplifiers.

It will be appreciated that the principles of the invention may readily be applied to audio signal processing uses other than video disc players where the audio signals may be of matrixed two-channel, un-matrixed two channel, or monophonic form. One such use is in the processing of monaural-stereophonic-billingual television sound signals. Other uses will be readily apparent to one of skill in the art.

What is claimed is:

1. Apparatus for processing an audio FM input signal conveying audio information in single-channel, matrixed two-channel or un-matrixed two-channel form, comprising:

signal processing means including first and second FM demodulator means having input means for receiving said audio FM input signal and output means for providing respective first and second audio signals, S1 and S2, and having first and second defect detector means coupled to respective ones of said demodulator means for providing respective first and second audio defect indicating signals;

audio matrix means for receiving said audio signals and being responsive to a first condition of a first control signal supplied thereto for assuming a first operating mode for producing at a first output terminal a first output signal S3 proportional to the sum of said audio signals and for producing at a second output terminal a second output signal, S4, proportional to the difference of said audio signals, said audio matrix means being responsive to a second condition of said first control signal for assuming a second operating mode wherein each of said first and second output signals at said first and second output terminals is proportional to said sum of said audio signals;

audio muting means for coupling said first and second audio signals to said audio matrix means and being responsive to first and second muting signals supplied thereto for muting respective ones of said first and second audio signals;

control means for producing said first control signal and a second control signal, said control signals being representative of selected processing modes of said apparatus, said control means being coupled to apply said first control signal to said matrix means for controlling the operating mode thereof; and logic means for combining said first control signal and said first defect indicating signal to form said muting signal and for combining said second control signal and said second defect indicating signal to form said second muting signal.

2. The apparatus as recited in claim 1 wherein said audio matrix means comprises:

amplifier means responsive to said second audio signal and to said first condition of said first control signal for producing an inverted output signal, said amplifier means being responsive to said second condition of said first control signal for producing a non-inverted output signal in lieu of said inverted output signal;

first means for summing both of said audio signals to produce said first output signal, S3; and second means for summing said first audio signal with the output signal of said amplifier means for producing said second output signal, S4.

3. The apparatus recited in claim 2 wherein said amplifier means comprises:

an amplifier having inverting and non-inverting input terminals and an output terminal;

means for applying said second of said audio signals to each of said input terminals of said amplifier;

a feedback path connected between said output terminal and said inverting input terminal of said amplifier; and means for coupling said non-inverting input terminal to a point of reference potential for said first condition of said first control signal and decoupling said non-inverting input terminal from said point of reference potential for said second condition of said first control signal.

4. The apparatus as recited in claim 1 further comprising:

second control means for producing a third audio muting signal; and second logic means for applying said third audio muting signal to said audio muting means for muting both of said first and second audio signals.

5. Apparatus for processing an audio FM input signal conveying audio information in single-channel, matrixed two-channel or un-matrixed two-channel form, comprising:

signal processing means including first and second FM demodulator means having input means for receiving said audio FM input signal and output means for providing respective first and second audio signals and having first and second defect detector means coupled to respective ones of said demodulator means for providing respective first and second audio defect indicating signals;

audio matrix means for receiving said audio signals and being responsive to a first condition of a first control signal supplied thereto for assuming a first operating mode for producing at a first output terminal a first output signal proportional to the sum of said audio signals and for producing at a second output terminal a second output signal proportional to the difference of said audio signals, said audio matrix means being responsive to a second condition of said first control signal for assuming a second operating mode wherein each of said first and second output signals at said first and second output terminals is proportional to said sum of said audio signals;

audio muting means comprising track and hold circuit means having a tracking mode for coupling said audio signals to said matrix means and having a holding mode responsive to first and second muting signals supplied thereto for decoupling respective ones of said first and second audio signal from said matrix means, said track and hold circuit means including means for de-emphasizing said audio signals when in said tracking mode;

control means for producing said first control signal and a second control signal, said control signals being representative of selected processing modes of said apparatus, said control means being coupled to apply first control signal to said matrix means for controlling the operating mode thereof; and logic means for combining said first control signal and said first defect indicating signal to form said first muting signal and for combining said second control signal and said second defect indicating signal to form said second muting signal.

6. The apparatus as recited in claim 5 wherein said track and hold circuit means includes:

means for removed a d.c. component of said first audio signal; and means for restoring said d.c. component of said first audio signal to a predetermined level.

* * * * *